United States Patent [19]

Huinink

[11] 4,287,929

[45] Sep. 8, 1981

[54] PNEUMATIC VEHICLE TIRE

[75] Inventor: Heinrich Huinink, Garbsen, Fed. Rep. of Germany

[73] Assignee: Continental Gummi-Werke Aktiengesellschaft, Hanover, Fed. Rep. of Germany

[21] Appl. No.: 119,763

[22] Filed: Feb. 8, 1980

[30] Foreign Application Priority Data

Feb. 12, 1979 [DE] Fed. Rep. of Germany ....... 2905244

[51] Int. Cl.³ .............................................. B60C 9/08
[52] U.S. Cl. ........................... 152/354 R; 152/357 R; 152/361 R; 152/362 R
[58] Field of Search ................ 152/353 R, 354 R, 355, 152/356 R, 357 R, 361 R, 362 R

[56] References Cited

U.S. PATENT DOCUMENTS

| | | | |
|---|---|---|---|
| 3,058,509 | 10/1962 | Maiocchi | 152/356 |
| 3,245,454 | 4/1966 | Lewis | 152/354 R |
| 3,363,660 | 1/1968 | Mirtain et al. | 152/353 |
| 3,442,315 | 5/1969 | Mirtain | 152/354 R |
| 3,703,203 | 11/1972 | Simpson | 152/354 R |
| 4,177,852 | 12/1979 | Merli et al. | 152/354 R |

Primary Examiner—John E. Kittle

Attorney, Agent, or Firm—Becker & Becker, Inc.

[57] ABSTRACT

A pneumatic vehicle tire with a pull-resistant belt which extends essentially over the width of the tread and essentially stabilizes the tire body against lateral forces. The tire also has a reinforcement in the tire sidewall consisting of cord fabric layers, whereby the externally located cord fabric layer has a greater expansion, elongation, or elasticity than the cord fabric layer which faces or is directed toward the tire hollow chamber. Furthermore, the cord fabric layer of smaller elasticity is guided from bead to bead and is there secured or anchored by being looped around the bead cores. With at least approximately radial positioning of both cord fabric layers of the tire sidewall, the externally located cord fabric layer extends only from one bead to an adjoining tire shoulder, and in this region the edges of this cord fabric layer are arranged between the cord fabric layer which is guided from bead to bead and the edge of the belt. The cord fabric layer of greater elasticity may be arranged along the inner periphery between the cord fabric layer having the lesser elasticity and the bead core. The edge of the cord fabric layer with the greater elasticity may be directed toward that side of the bead core which is located adjacent to the hollow chamber inside the tire.

3 Claims, 1 Drawing Figure

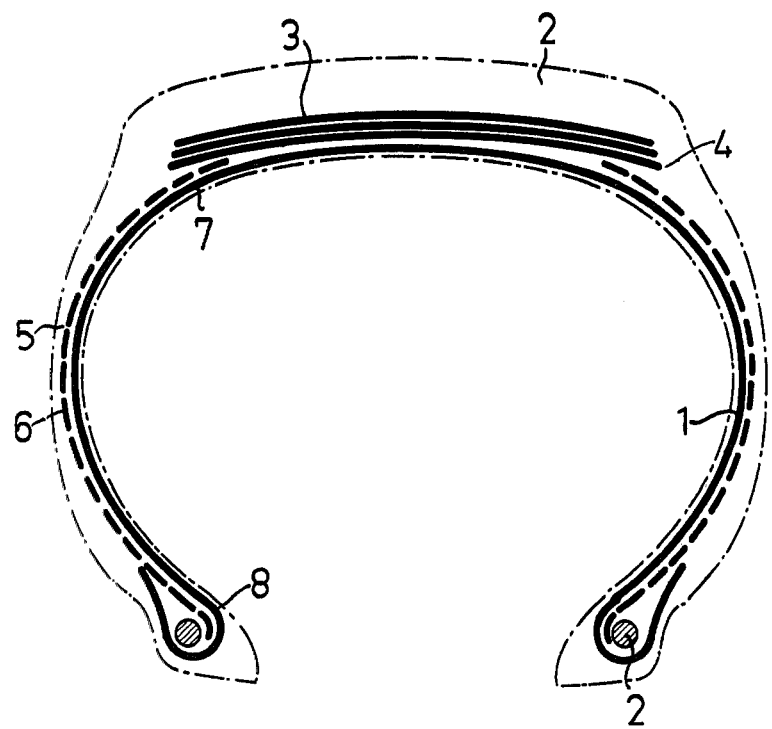

PNEUMATIC VEHICLE TIRE

The present invention relates to a pneumatic vehicle tire having a belt arranged between the carcass and the tread, and a carcass which is embodied in two layers in the region of the tire sidewall, whereby the outer layer has a greater expansion, elongation, or elasticity in comparison to the other layer.

The known tires of this type are cross carcass tires, with which the aforementioned layers of differing elasticity respectively extend from one bead to another bead.

The basic object of the present invention is essentially to improve a tire carcass such that the carcass has a great resilience or bending capability, yet is extensively protected against external influences in the region of the tire sidewall.

This object, and other objects and advantages of the present invention, will appear more clearly from the following specification in connection with the accompanying drawing, which shows a partial cross section through a belted tire of the present invention.

According to the present invention, it is proposed to provide a tire having a so-called radial carcass with two layers of different elasticity in the region of the tire sidewalls, though in such a manner that the layer with the greater elasticity extends only from one tire bead to an adjoining tire shoulder, whereby preferably that edge of this layer with the greater elasticity located along the outer periphery is arranged between the belt and the actual carcass layer located therebelow. Such an intermediate placement can also occur in the region of the bead, in that the edge located along the inner periphery is arranged between the bead core and the aforementioned actual carcass layer.

Preferably under such circumstances the continuous, actual carcass layer comprises rayon, while the outer layer arranged only in the region of the tire sidewalls comprises polyamide or a synthetic material having similar expansion elasticity, in which connection it is understood that these layers are so-called cord layers which are securely connected with the tire body of rubber or the like.

Protection of the endangered carcass layer, namely a sidewall protection, is attained by such a feature or measure. Simultaneously, however, a disadvantageous influence is hindered or precluded which is conditioned or brought about by the double-layer characteristic of the side wall reinforcement under normal preconditions. Especially advantageous under these circumstances is the aforementioned arrangement of the edges between the mentioned structural parts, i.e. in the region of the belt edge and in the region of the bead core. A fixing of the additional sidewall or layer is advantageous. Undesired movement or deformation is accordingly forestalled or prevented in the edge region.

Referring now to the FIGURE in detail, the tire body, which comprises rubber or rubber-like material, is reinforced by a carcass 1 which is embodied as a so-called radial carcass and has uninterrupted rayon threads in a cord layer guided from bead to bead; the ends of the threads are secured or anchored by being looped around the bead core 2.

A multi-layer belt 3 is located between the carcass 1 and the tread 2. This belt 3 is pull-resistant in the peripheral direction and can stabilize the tire body especially against lateral forces. The edges of this belt 3 terminate in the shoulder zone 4 of the tire, i.e., essentially below the edges of the tread.

The tire sidewalls 5 of the tire body are formed by a reinforcing insert 6 placed externally on the carcass 1. The insert 6 comprises polyamide (e.g. nylon) threads arranged in a cord layer. Both the threads of the carcass 1 and the threads of the layer 6 extend radially, at least practically radially, of the tire.

The upper edge 7 of the layer 6 is located between the edge of the belt 3 and the carcass 1, while the edge 8 of the layer 6 placed or located along the inner periphery is fixedly secured between the carcass 1 and the bead core 2. The edge 8 extends approximately radially toward the inside; the edge 8 accordingly is not looped around the bead core 2, and such looping is the case only with the carcass 1.

It is to be understood that both the edge 7 and the edge 8 are arranged stiffly or rigidly between the aforementioned structural parts of the tire, in order in this manner to bring about a holding.

The different materials in the tire sidewall 5 have practically no disadvantageous influence upon the resilience or bending capability of the tire sidewall 5 as a result thereof, though a mechanical protection is attained collectively for the carcass 1 and for the tire sidewall 5.

The overlapping in the region of the belt edges should be approximately 8 to 25 mm.

The present invention is, of course, in no way restricted to the specific disclosure of the specification and drawing, but also encompasses any modifications within the scope of the appended claims.

What I claim is:

1. A pneumatic vehicle tire having a hollow inner chamber defined by a rubbery body with inner periphery as well as outer periphery and comprising in combination:
   a tread included with the body;
   a shoulder region of the body on each side of and adjacent to said tread;
   a sidewall of the body on each side of and adjacent to said shoulder regions;
   a bead section adjacent each of said sidewalls;
   a bead core in each of said bead sections;
   a reinforcement having an edge located along inner periphery as inserted extending at least approximately radially and including a radially inner first rayon cord fabric layer directed toward said hollow inner chamber, and two radially outer second polyamide cord fabric layers, said first layer having a first elasticity and extending from one bead section to another and being anchored therein along outer periphery and simultaneously along inner periphery by being looped around the respective bead cores; and
   a pull-resistant belt located between said tread and said first layer, extending essentially over the width of said tread between said should regions, and essentially stabilizing the tire body against lateral forces, said second layers having a greater elasticity than said first layer, one of said second layers being located in each of said sidewalls and extending from a respective bead section to the respective adjacent shoulder region, with that edge of the respective second layer which is located in said pertaining shoulder region being located between a pertaining edge of said belt and said first layer.

2. A tire in combination according to claim 1, in which that edge of the respective second layer which is located in said pertaining bead section is located between said first layer and said pertaining bead core.

3. A tire in combination according to claim 2, in which that edge of the respective second layer which is located in said pertaining bead section is located on that side of said pertaining bead core facing said hollow inner chamber.

* * * * *